Aug. 5, 1952  R. B. JOHNSON ET AL  2,606,244
DATA RECEIVING AND RETAINING MECHANISM
Filed March 30, 1948  9 Sheets-Sheet 1
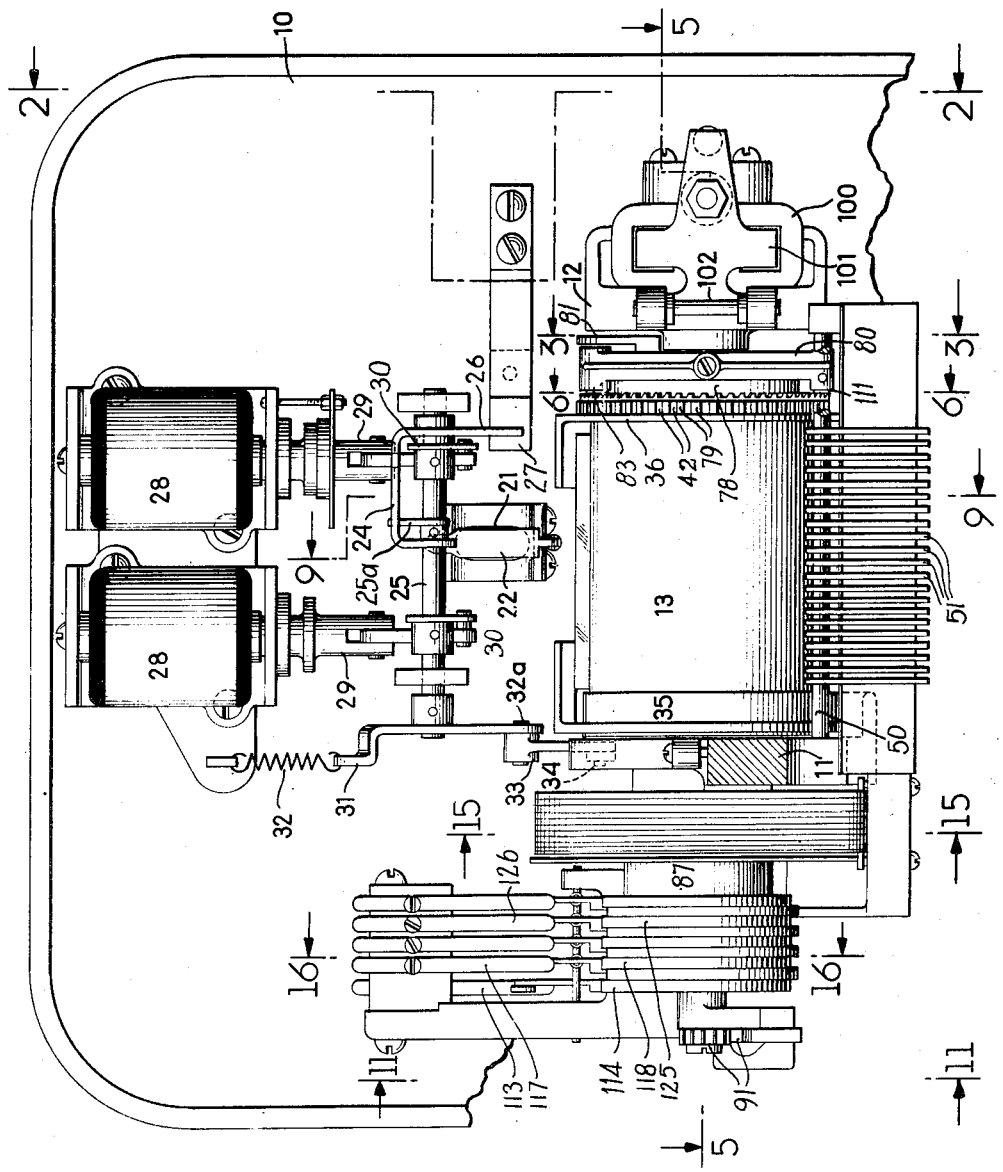
FIG_1_
INVENTORS
REYNOLD B. JOHNSON
HENRY A. JURGENS
OTTO F. McNEAGLE
BY William Lang
ATTORNEY Aug. 5, 1952

R. B. JOHNSON ET AL 2,606,244

DATA RECEIVING AND RETAINING MECHANISM

Filed March 30, 1948

INVENTORS
REYNOLD B. JOHNSON
HENRY A. JURGENS
OTTO F. MONEAGLE
BY William Lang
ATTORNEY

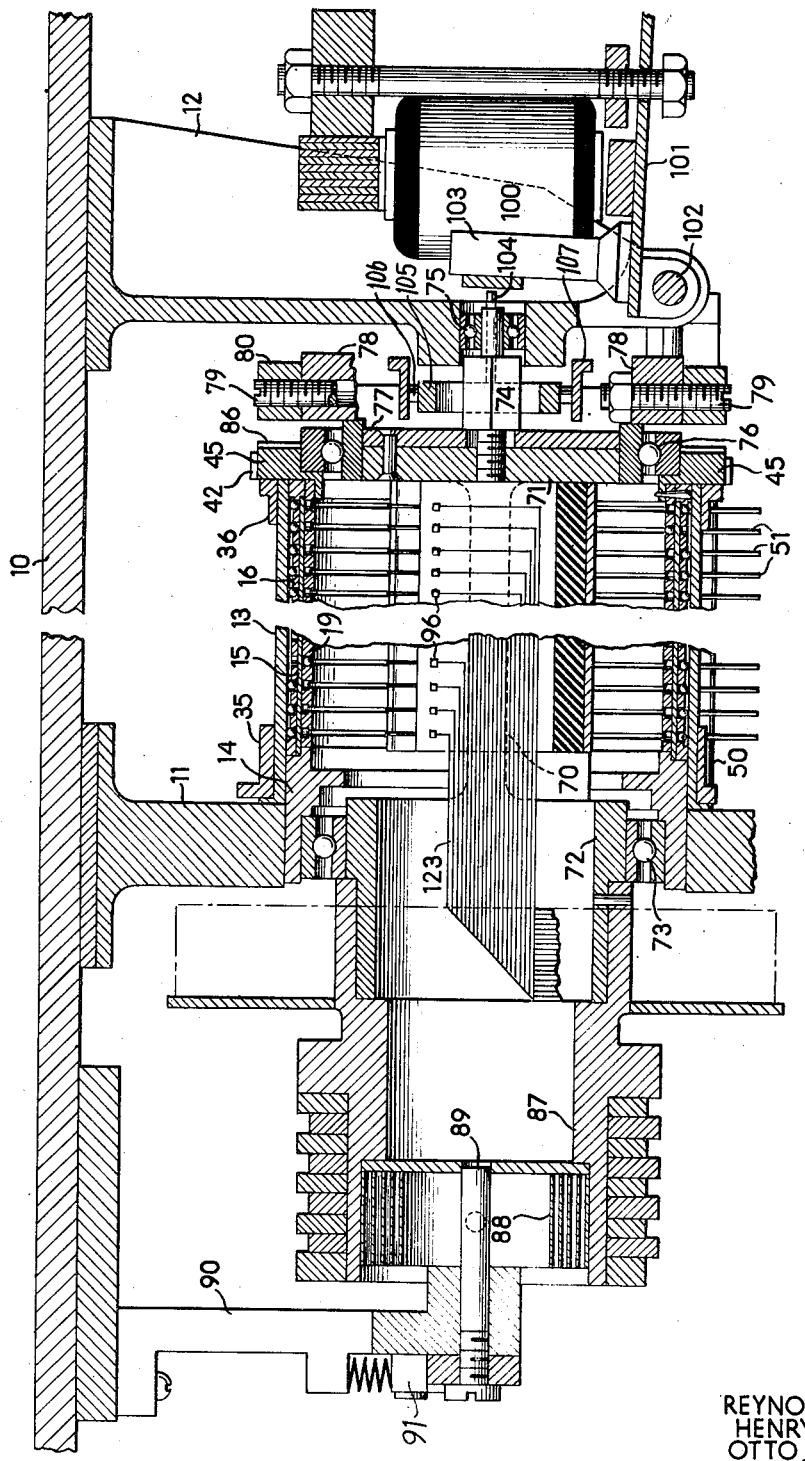

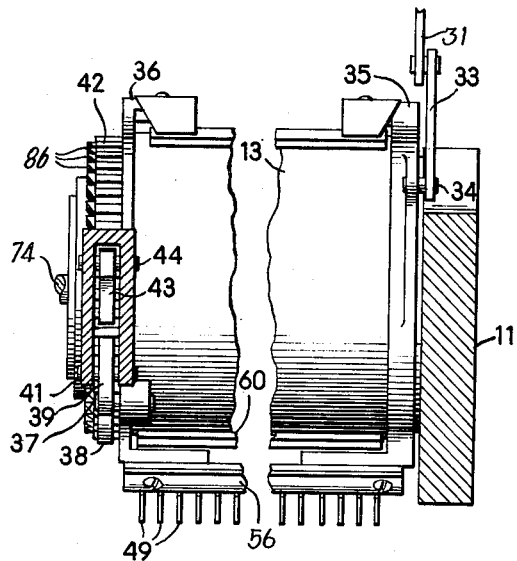
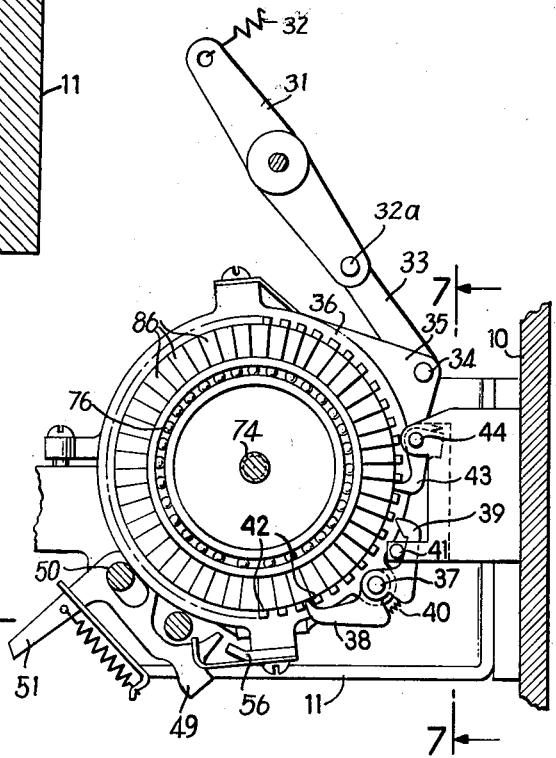
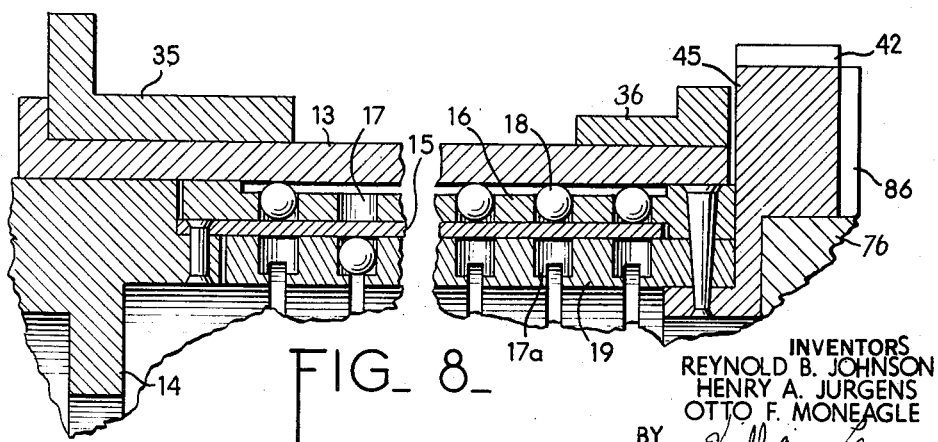

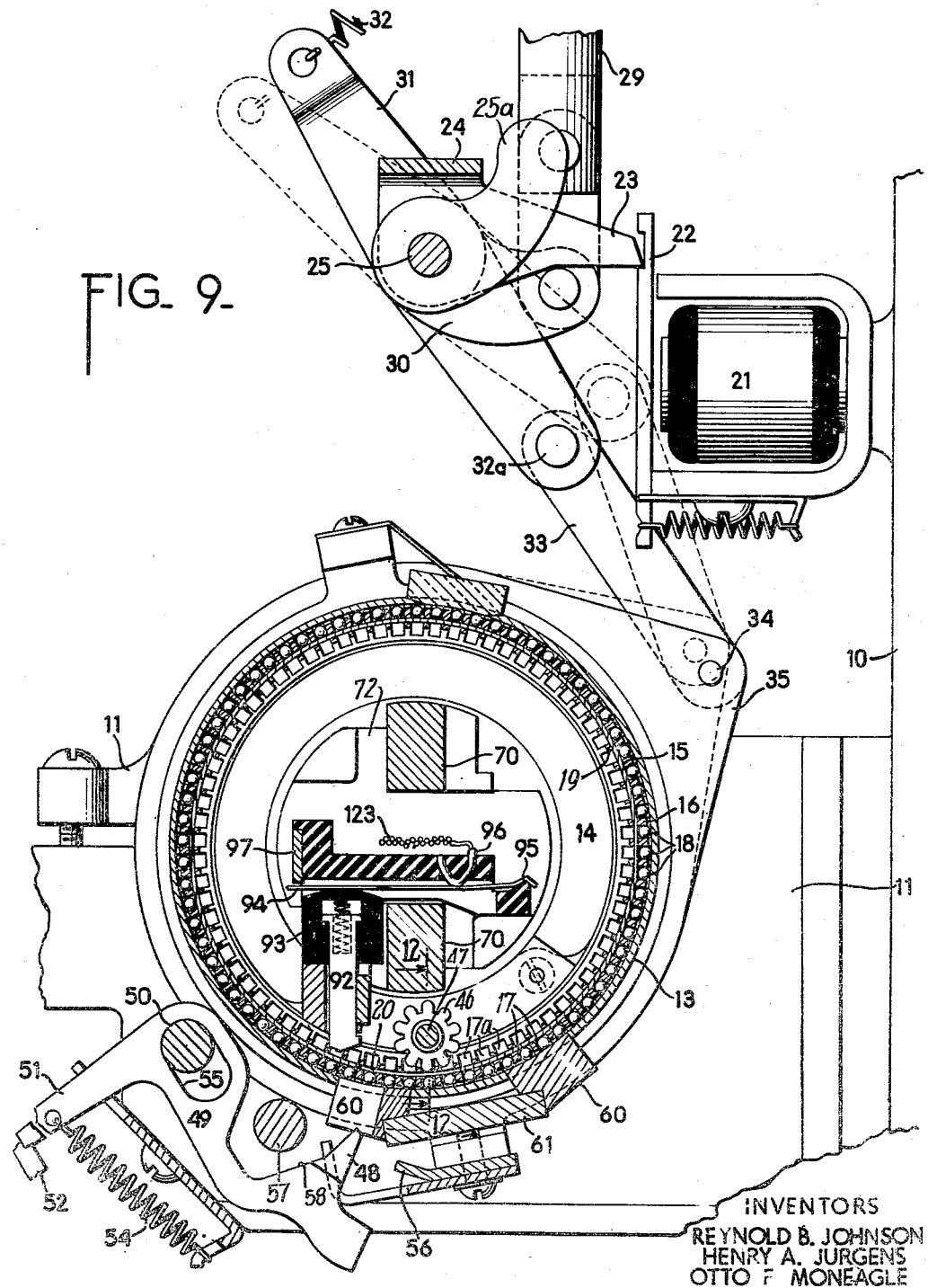

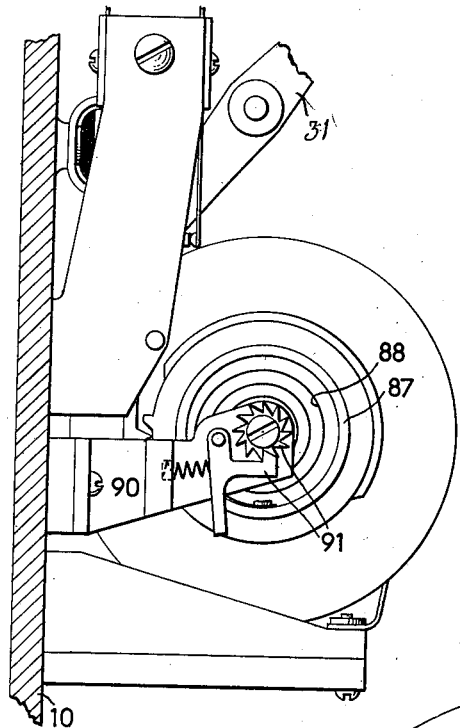
FIG_11_
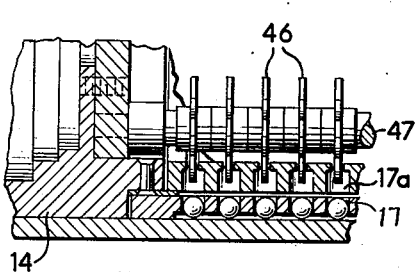
FIG_12_
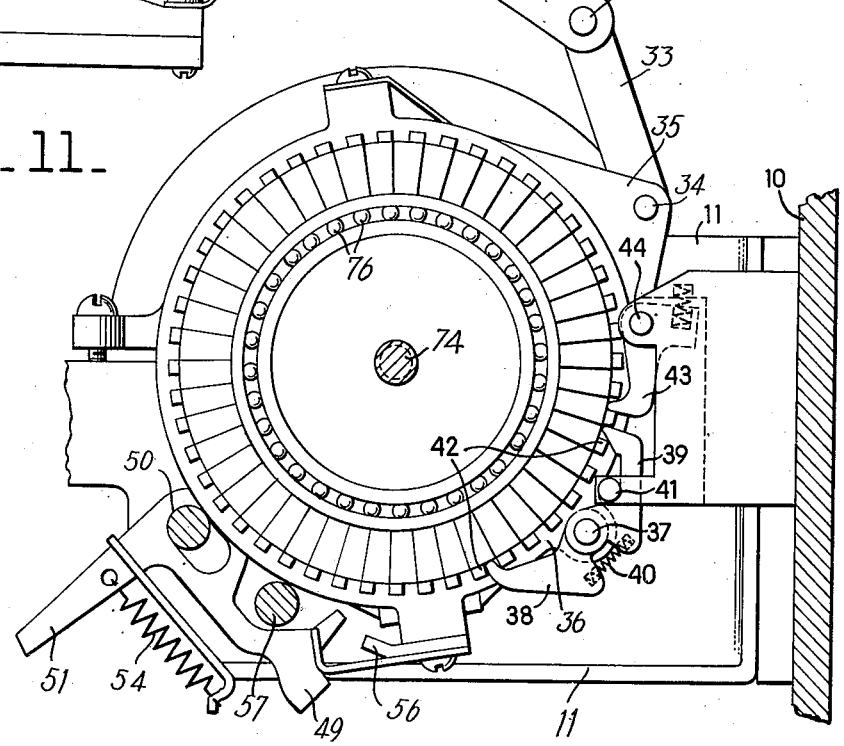
FIG_10_

Aug. 5, 1952    R. B. JOHNSON ET AL    2,606,244
DATA RECEIVING AND RETAINING MECHANISM
Filed March 30, 1948    9 Sheets-Sheet 8
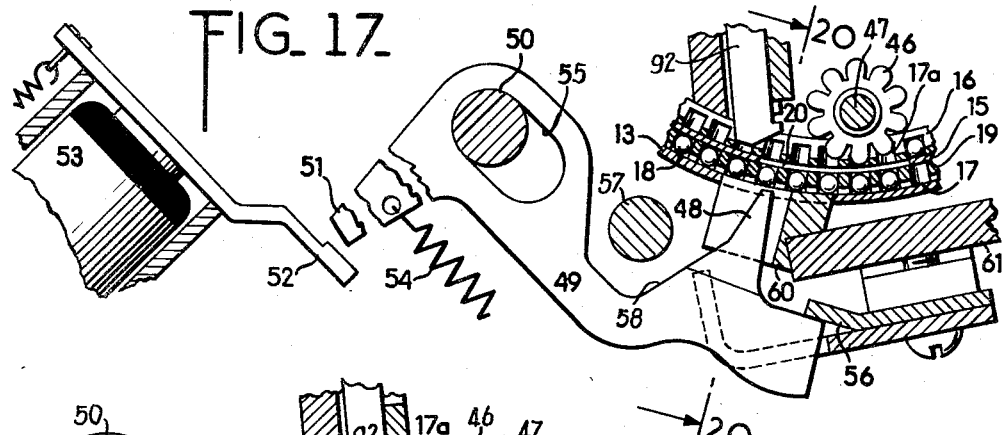
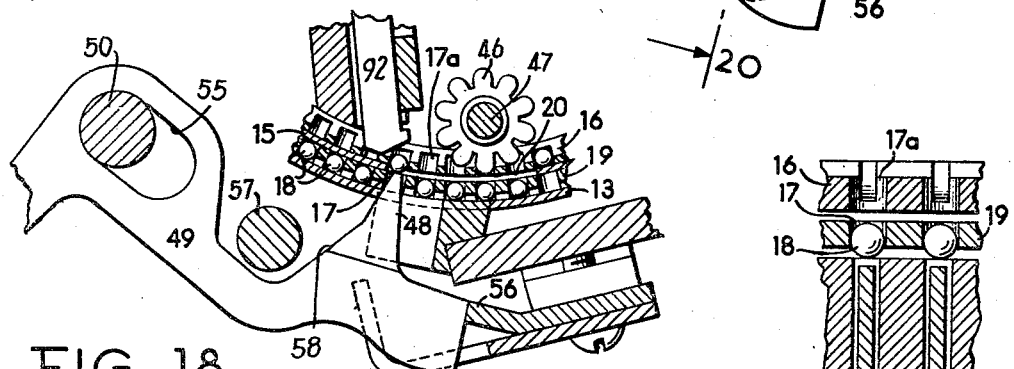
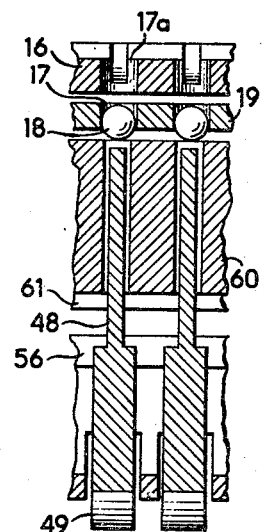
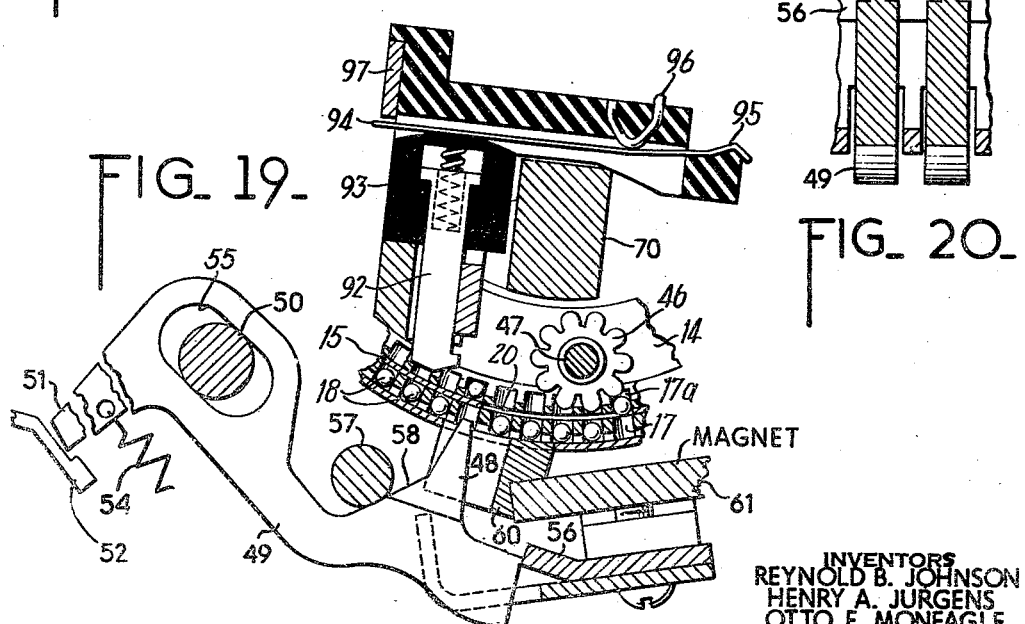
INVENTORS
REYNOLD B. JOHNSON
HENRY A. JURGENS
OTTO F. MONEAGLE
BY William Lang
ATTORNEY

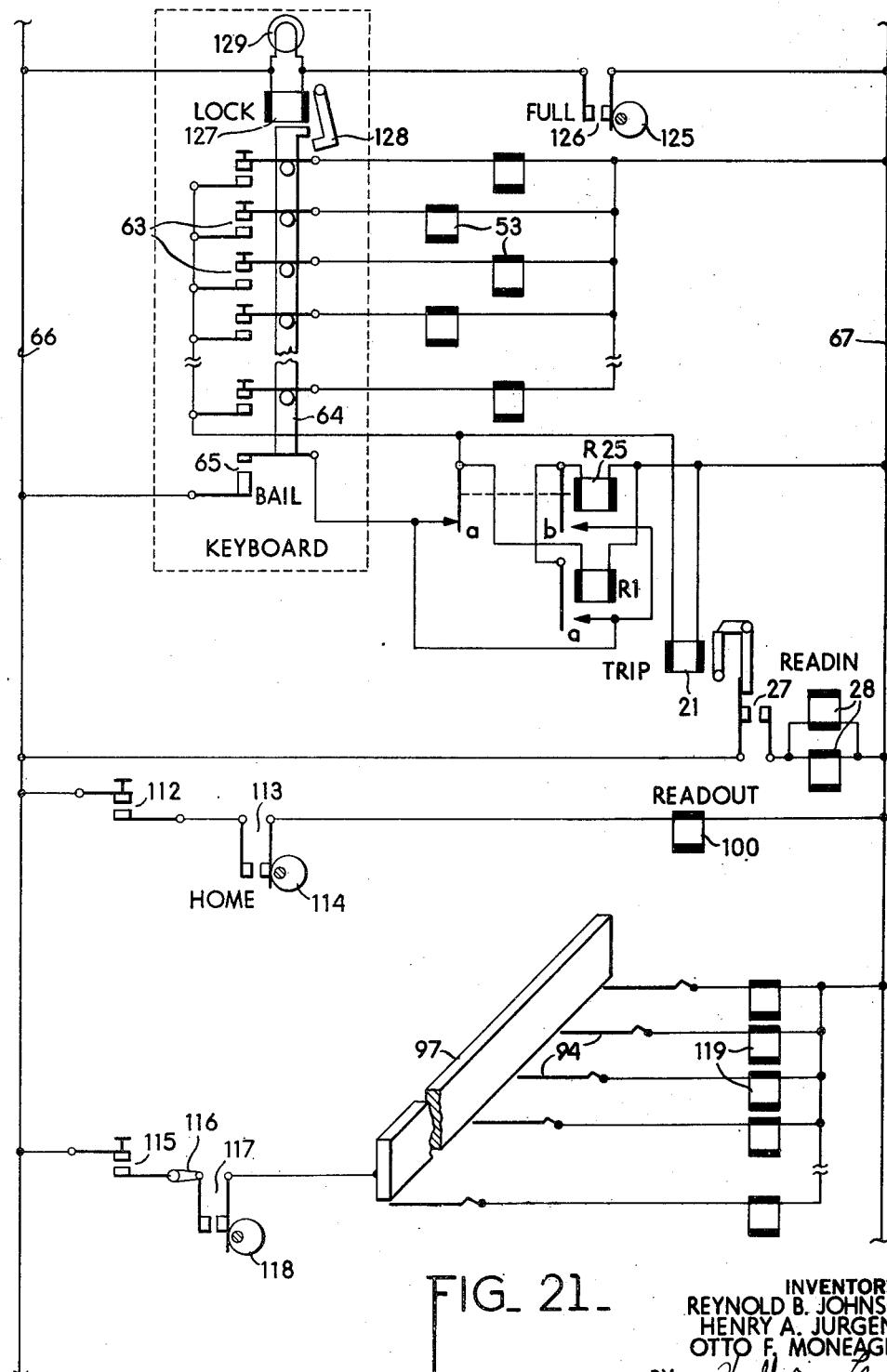
FIG_21_

Patented Aug. 5, 1952

2,606,244

UNITED STATES PATENT OFFICE 2,606,244

DATA RECEIVING AND RETAINING MECHANISM

Reynold B. Johnson, Binghamton, Henry A. Jurgens, Endicott, and Otto F. Moneagle, Union, N. Y., assignors to International Business Machines Corporation, New York, N. Y., a corporation of New York Application March 30, 1948, Serial No. 17,974

9 Claims. (Cl. 177—380)

1

This invention relates to data storage devices and more particularly to key controlled storage devices in which data may be entered step by step, with each key operation constituting a step of operation.

The principal object of the invention is to provide an improved form of storage mechanism of the type disclosed in Patents 2,343,414 and 2,424,097, granted March 7, 1944, and July 15, 1947, respectively. In these patents a storage mechanism is provided which is directly controlled by keys to receive settings representative of information to be punched, and also to receive settings representative of skipping, releasing, spacing and other functional data. This storage mechanism in turn controls the operation of the punching machine to effect the punching and other operations in the order in which they were previously set up in the storage mechanism by the operator. The readin operation, during which the operator effects settings in the storage mechanism, is independent of the so-called readout operation, during which the storage mechanism controls the punch, so that while the operator is entering certain data the storage mechanism is controlling the punching in accordance with some previously extended data.

One of the objects of the invention is to provide an improved flexible relationship between the readin and readout operations, whereby for some types of work the readout operations follow the readin operations in close succession so that, as a value to be punched is read in, the next preceding value set up is read out. For other types of operation, the readout operations may be delayed until a desired number of entries has been made in the storage mechanism. The purpose of this delay is to allow the operator a means of error correction. Thus, in rapidly keying the letters of a name or word, the operator is often conscious of having made an error in keying after passing the point at which the error occurred and, if there were no delay between the readin and readout operation, such error would be recorded by the punch with resultant spoilage of a record card.

Provision is made in the machine so that, if such an error is noted, the readout devices may be caused to pass up the entries already made by that field without being responsive thereto and the name or word rekeyed.

In the embodiment of the invention disclosed herein, there is provided a cylinder whose outer surface is provided with rows of circumferentially spaced elongated pockets extending radially. An interposer in the form of a ball is located in each pocket and normally positioned in the outer extremity thereof. The rows of pockets and the balls extending in the direction of the longitudinal axis of the cylinder represent separate entering positions, and the positions along the rows represent data values. To represent data in any position, the related ball is shifted from the outer extremity or ring of the pocket to the inner extremity. This is done by rotating the cylinder so that the rows pass a setting position one by one and, as each row is presented to the station, one or more balls in each row is or are shifted, thereby setting up a pattern of entered data represented by balls arranged in an inner circle on the cylinder.

These entries are made under key control with the stepping mechanism for the cylinder coordinated so that, for each key operation, a ball is shifted and an accompanying step of advance takes place. Prior to the arrival of each row at the setting station, any balls therein occupying an inner or set position are restored to their normal or outer position.

Within the cylinder is a readout device in the form of a row of wipers and a contact for each. This device is coupled to the cylinder and during entering operations is stepped therewith, so that it maintains a fixed relationship with respect to the cylinder. After the cylinder and readout device have been stepped ahead for a number of entries, the readout device may be moved step by step in a reverse direction to cause the wipers to traverse the set balls row by row and closed contacts corresponding to the set balls which, through circuit connections, energize magnets; for example, the punch controlling magnets of the patents referred to.

The operation of the device is disclosed herein in a simplified manner to illustrate how key operations will effect entries one by one and how the data is read out step by step to control a set of magnets corresponding to punch controlling magnets of the patents referred to.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation of the storage unit with the readin magnet section omitted; the view is represented as looking in the direction of lines 1—1 of Fig. 2.

Fig. 5 is a plan section looking in the direction of lines 5—5 of Fig. 1.

Fig. 6 is a section taken on line 6—6 of Fig. 1, showing the cylinder stepping mechanism.

Fig. 7 is a view looking in the direction of lines 7—7 of Fig. 6.

Fig. 8 is a detail on an enlarged scale showing the construction of the storage cylinder and related elements.

Fig. 9 is a section taken on lines 9—9 of Fig. 1.

Fig. 10 is a view similar to Fig. 6 showing the parts in operating position.

Fig. 11 is an elevation looking in the direction of lines 11—11 of Fig. 1.

Fig. 12 is a detail view of the interposer ball restoring wheels, the section being taken along lines 12—12 of Fig. 9.

Figs. 17, 18 and 19 show on an enlarged scale successive positions of the parts operated to effect a setting of data in the mechanism.

Fig. 20 is a section taken on lines 20—20 of Fig. 17.

Fig. 21 is a simplified circuit arrangement showing schematically the manner in which key controlled entries may be made and the manner in which data may be read out therefrom.

Figures 2, 3, 4:
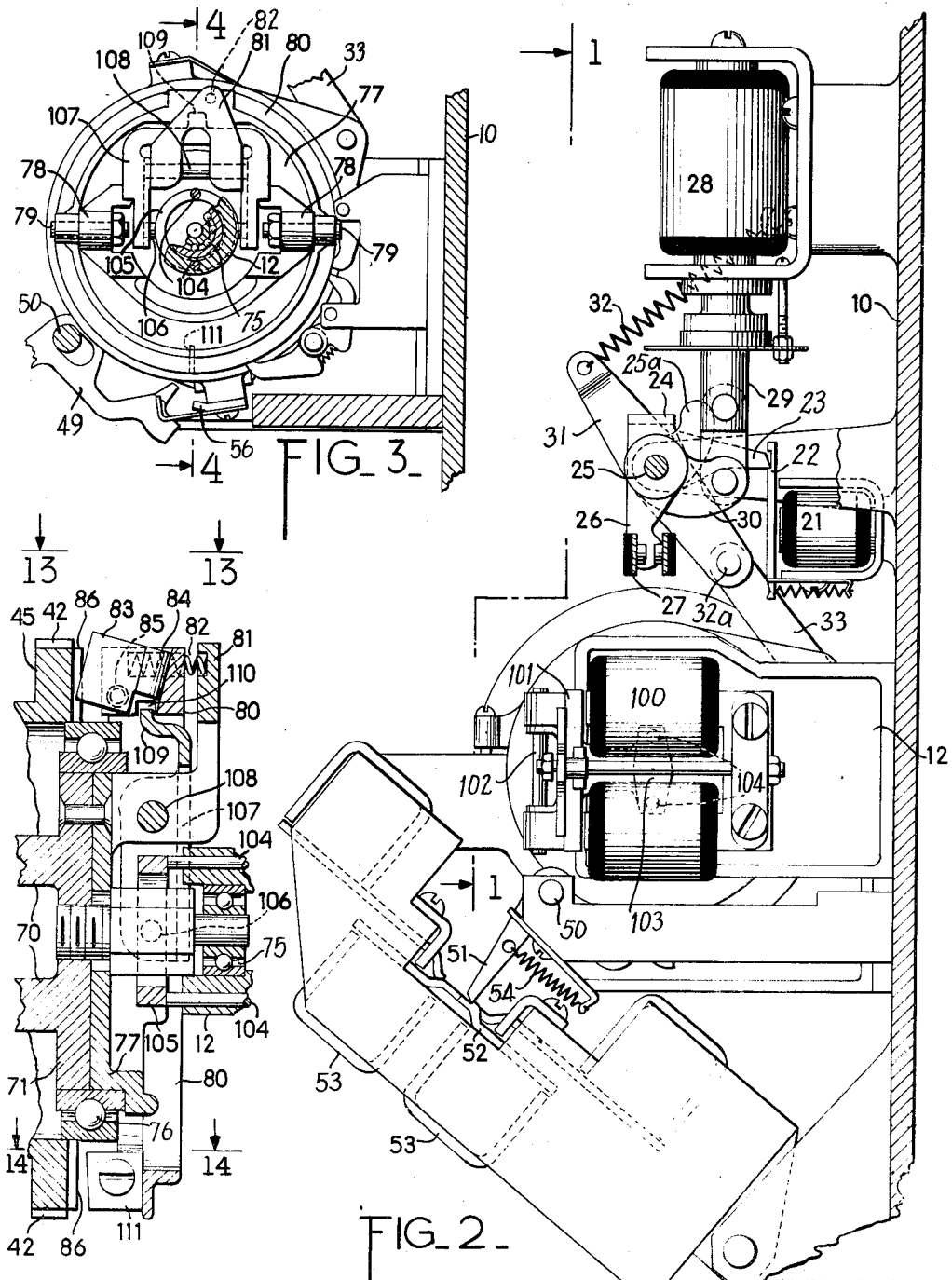
Fig. 2 is a side elevation of the apparatus looking in the direction of lines 2—2 of Fig. 1.
Fig. 3 is a section taken on lines 3—3 of Fig. 1.
Fig. 4 is a section taken on lines 4—4 of Fig. 3.

Referring to Figs. 1, 2 and 5, the storage mechanism is mounted upon the base 10 to which brackets 11 and 12 are secured. Located between these two brackets (see Fig. 5) is a cylinder or shell 13 (see also Fig. 9) which is supported at its left end by a member 14 secured to bracket 11.

Secured to member 14 is a shell or cylinder 15 (see Fig. 8). Extending into the space between shell 15 and cylinder 13 is a cylinder 16 provided with twenty-one rings each having seventy-two circumferentially spaced pockets 17 for receiving interposer balls 18. A further cylinder 19 extends inside shell 15 and is secured to cylinder 16 to form an integral unit therewith. The shell 19 is also provided with rows or columns of pockets 17a, each of which is in axial alignment with the corresponding pocket 17, so that the two in effect constitute one pocket in the unitary structure with the pockets intersected by shell 15. The shell 15, as stated, is held stationary and cylinder 16, 19 is rotatively advanced step by step in the manner to be presently explained to bring the rows of interposers 18 into line with an opening 20 (Fig. 9) in shell 15 through which the balls 18 may be shifted from the outer pocket 17 to the inner pocket 17a or from a normal to a set position (Figs. 17, 18, 19).

Referring to Figs. 2 and 9, a trip magnet 21, when energized, will attract its armature 22 to release a finger 23 integral with a bail 24 loose on rod 25 (Fig. 1). A finger 26 also integral with bail 24 is biased clockwise by a blade of a pair of contacts 27 (Fig. 2), so that upon energization of magnet 21 the contact blade will rock bail 24 to enable closure of contacts 27. These, as will be explained in connection with the circuit diagram, will cause energization of a pair of operating solenoids 28, both of which have their plungers 29 connected to arms 30 secured to rod 25, so that the energization of the solenoids results in counterclockwise rocking of rod 25 as viewed in Figs. 2 and 9.

Secured to the rod 25 is a lever 31 normally biased in a clockwise direction by spring 32 at the upper end thereof. The lower end of the lever has connection through a pin 32a to a link 33 which in turn has pin connection 34 with a ring 35 integral with cylinder 13. Energization of solenoids 28 will rock lever 31 to its broken line position in Fig. 9 and through link 33 will thereupon rock shell 13 in a counterclockwise direction. When rod 25 is rocked counterclockwise, an arm 25a secured thereto (Fig. 9) will engage bail 24 to restore the latter to the latched position shown and through the depending arm 26 contacts 27 will be reopened. Such reopening will break the circuit to solenoids 28. Upon deenergization of the solenoids spring 32 will rock the parts back to the position of Fig. 9. Thus, the shell 13 is oscillated through an amplitude which is slightly greater than the angular spacing between adjacent balls 18.

Referring to Figs. 6 and 7, shell 13 has a ring 36 secured at its opposite end and to this ring there is pivoted at 37 a stepping dog 38 and an aligning dog 39. With the parts in normal position as shown in Fig. 6, the two dogs are normally urged in opposite direction by a compression spring 40 and a stationary pin 41 contacts the dog 39 to hold it in the position shown in Fig. 6. As the shell 13 is rocked counterclockwise carrying with it pin 37, dog 39 will ride into contact with one of a ring of teeth 42 to the position of Fig. 10, moving it against a dog 43 pivoted on a stationary pin 44. On the return stroke of the parts, the dog 38 will engage a tooth 42 and advance it one step. Thus, repeated oscillations of shell 13 and its dogs 38, 39 will move the teeth 42 in a clockwise direction tooth by tooth.

Referring to Fig. 8, these teeth 42 are cut in a ring 45 which is integral with the cylinder 16, 19 so that for each tooth 42 that is advanced a row of balls 18 will be likewise stepped in a clockwise direction as viewed in Figs. 6, 9 and 10. The cylinder 16, 19 will, of course, not move in the return direction of the shell as the pawl 43 will engage a tooth 42 to prevent such movement.

Referring to Figs. 19, 17 and 12, the circles of pockets 17a are slotted for passage of toothed wheels 46 which are rotatable on a fixed rod 47 which is secured to the member 14. The wheels 46 are so configured that, as cylinder 16, 19 rotates, the teeth of wheel 46 will be engaged by the dividing wall between the circumferentially spaced pockets 17a to thereby rotate the wheel and cause the teeth thereof to enter into the successive pockets 17a as they arrive at the right end of opening 20 in shell 15. Any interposer ball that may be in such pocket will be forced through the opening 20 into the companion pocket 17 or considering the two pockets as inner and outer parts of one, the ball will be shifted from the inner extremity of the pocket to the outer extremity through the opening 20.

The opening, as noted in Figs. 17 to 19, is coextensive with five pockets 17, and opposite the left end of the opening is a setting finger 48 of a lever 49 pivoted on a fixed rod 50. The lever is normally held in the relative position shown in Fig. 9 with an arm 51 thereof in engagement with the armature 52 of a magnet 53 (see Fig. 2). Normally, the arm 51 is latched on the armature 52 as shown in Figs. 2 and 9 with spring 54 rotating the lever against rod 50 as shown, so that the rod is in the upper end of a slot 55 of the lever.

Upon energization of magnet 53, armature 52 will be rocked to the position shown in Fig. 17, releasing lever 49 for counterclockwise rotation under the influence of spring 54. The lever will swing to the position of Fig. 17 where it is intercepted by a plate 56 which is secured to shell 13 through rings 35 and 36 (Fig. 7) and accordingly is oscillatable therewith.

As pointed out, the shell 13 is first rocked in a counterclockwise direction independently of the cylinder 16, 19 and accordingly plate 56 will be rocked to the position of Fig. 18, where it is seen that the plate has moved sufficiently to release lever 49, so that rocking of the lever under the influence of spring 54 will continue and the finger 48 will engage the ball 18 opposite the finger and will shift it from pocket 17 to adjacent pocket 17a.

Following this, as the shell 13 now moves in a clockwise direction carrying with it the cylinder 16, 19 as explained, the plate 56 will engage and move lever 49 along with the cylinder so that the finger 48 travels with the shifted ball 18, and as the ball advances it will ride on to the inner surface of the stationary shell 15. Continued advance of plate 56 will force lever 49 into engagement with a fixed rod 57 which through contact with inclined surface 58 of lever 49 will rock the lever out of the pocket, and at the same time the lever will be shifted on rod 50 to elevate the finger 51 into latching relationship with armature 52. Continued movement of the parts beyond the position shown in Fig. 19 will cause plate 56 to snap over the right end of lever 49 releasing it to the influence of its spring 54, which will thereupon rock the lever about the contacting point with armature 52 and swing it back to the position of Fig. 9.

The shell 13 has secured thereto (see Fig. 9) a pair of blocks 60 between which there is secured a permanent magnet 61. The left hand block 60 is slotted to guide fingers 48 (see Fig. 20). This arrangement provides a magnetic field extending through several adjacent balls 18 in positions opposite the opening 20 in shell 15. Thus, while the balls are passing the opening they will be attracted into their outer positions and prevented from moving inwardly, unless engaged by finger 48.

The foregoing constitutes the mechanism for effecting a setting or reading in and may be briefly reviewed in connection with the circuit diagram in Fig. 21 in which the magnets 53 are each connected to a pair of key operated contacts 63. As diagrammatically represented, operation of any key will through a link 64 operate the usual bail contacts 65 of a typewriter keyboard such as illustrated in the patents referred to. Closure of contacts 65 will complete a circuit from positive side of line 66, through contacts 65, normally closed $a$ contacts of the relay R25, the contact (or contacts) 63 to one or more of the magnets 53 to negative side of line 67. This, as explained, will result in the tripping of a related lever 49 to the position of Fig. 17. A parallel circuit extends from contacts 65, through the $a$ contacts of relay R25 to the trip magnet 21 and line 67, so that this magnet is energized concurrently with the magnet 53 and, as explained in connection with Fig. 2, the magnet will cause closure of contacts 27 to complete a circuit from line 66, through the contacts 27 to the readin solenoids 28 to line 67.

The connection of the solenoids will first rock shell 13 in one direction to free the tripped levers 49, so that they may shift balls 18 in the adjacent row into their set or inner positions. On the return stroke, the cylinder 16, 19 will advance one step to cause the set balls to pass the inside shell 15. In Fig. 21 the closure of contacts 65 will complete a circuit extending through the $a$ contacts of magnet R25 to energize the relay R1 which will in turn close its $a$ contacts to energize relay R25 through a circuit from line 66, contacts 65, $a$ contacts of relay R1 to relay R25 and line 67. The relay R25 will thereupon close its $b$ contacts to provide a holding circuit from line 66, contacts 65, $b$ contacts of relay R25 to line 67. The $a$ contacts of relay R25 will accordingly open and remain open as long as contacts 65 are held closed. This circuit arrangement will prevent so-called repeat operations and requires release of the key before a further entry can be made. As stated in the mechanical description, solenoids 28 when energized will cause reopening of contacts 27 and relatching of the armature of trip magnet 21.

Readout mechanism

Extending through the ball retaining cylinders (see Figs. 5 and 9) is a pair of cross bars 70 integral with a head 71 at the right end, as viewed in Fig. 5, and a head 72 at the left end. The head 72 is supported by bearing 73 and head 71 is supported by stud 74 threaded therein and rotatable in a bearing 75 of bracket 12. The head 71 in turn carries a bearing 76 supporting the gear 45 and connected shells 16, 19. With this arrangement the bars 70 are rotatable within the ball supporting shells and conversely the shells are rotatable about the bars. During readin operations the head 71 is coupled to gear 45 to move therewith when the latter is advanced. This coupling is brought about as follows.

Figure 13:
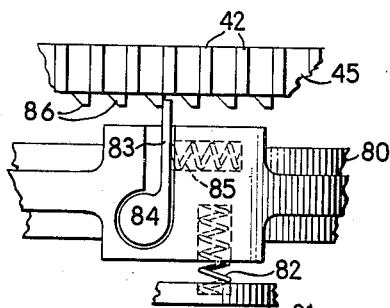
Fig. 13 is a view of the readout escapement pawl looking in the direction of lines 13—13 of Fig. 4 with the view rotated through 90°.

Head 71 has a plate 77 secured thereto (Figs. 4 and 5) which is provided with a pair of bearings 78 (see Fig. 3) through which bolts 79 extend and support a ring 80 which is oscillatable about the bolts (see also Fig. 1). Plate 77 (Figs. 3 and 4) has also integral therewith an extension 81 between which and a point on ring 80 there is a compression spring 82 which serves to bias the ring about the bolts 79 into the position shown in Figs. 4 and 13. Carried by ring 80 in the vicinity of spring 82 is a pawl 83 having a rounded end 84 recessed in a socket formed in the ring and biased by a spring 85 in a counterclockwise direction as viewed in Fig. 13. During readin operations, the pawl 83 engages with one of a series of teeth 86 cut in the face of gear 45 and, since as explained, during readin operations gear 45 moves toward the right as viewed in Fig. 13 ring 80 will be carried therewith, and through the connections described bars 70 will be turned in a like direction.

In Fig. 5 the left end of the head 72 has integrally connected therewith a drum 87 within which there is a spring 88 secured at the convolution thereof to the drum 87. The inner end of the spring is anchored to a rod 89 in bracket 90 which is provided with the usual tensioning pawl and ratchet designated 91. Accordingly, as the bars 70 are advanced in a clockwise direction with the ball supporting cylinders, as viewed in Fig. 9, the drum 87 (Fig. 11) will be turned counterclockwise to wind up spring 88 and store energy therein.

Referring to Fig. 9, the bars 70 support contact slides 92 of which there is one provided for each ring of balls. Each slide is provided with an insulating head 93 in engagement with a contact wire 94 pivoted at 95 and biased against head 93 by a contact element 96. Movement of slider 92 upwardly will move head 93 in the same direction through the spring connection shown to bend wire 94 about the fulcrum 96 into contacting engagement with a common contact plate 97 to complete a circuit as will be explained in connection with the circuit diagram. Inasmuch as bars 70 advance step by step with the cylinders 16, 19, the slides or wipers 92 move therewith. This is illustrated in Figs. 17, 18 and 19 in the last of which it is noted that the wiper 92 has advanced one step from the so-called home position of Fig. 17. Continued operation of the readin mechanism will step the wipers around and, after a number of rows of balls have been set, the bars 70 may be rocked step by step back to the home position to cause the wipers to traverse the balls set in the inner circle, and as each set ball is engaged and passed over by a wiper the latter will be shifted to close contacts 94, 97.

The stepping for readout purposes is effected by magnet 100 (Fig. 5) which upon energization will rock its armature 101 pivoted at 102 on bracket 12. An extension 103 integral with the armature will engage a pair of pins 104 (Figs. 2 and 4) which are slidable in suitable holes through the bracket 12. The pins engage a ring 105 which is pivoted at 106 (Fig. 3) to a lever 107 which in turn is pivoted to a stud 108 in the member 77.

Figure 14:
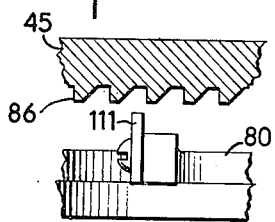
Fig. 14 is a section taken on lines 14—14 of Fig. 4 showing the holding pawl of the readout escapement mechanism.
Figure 16:
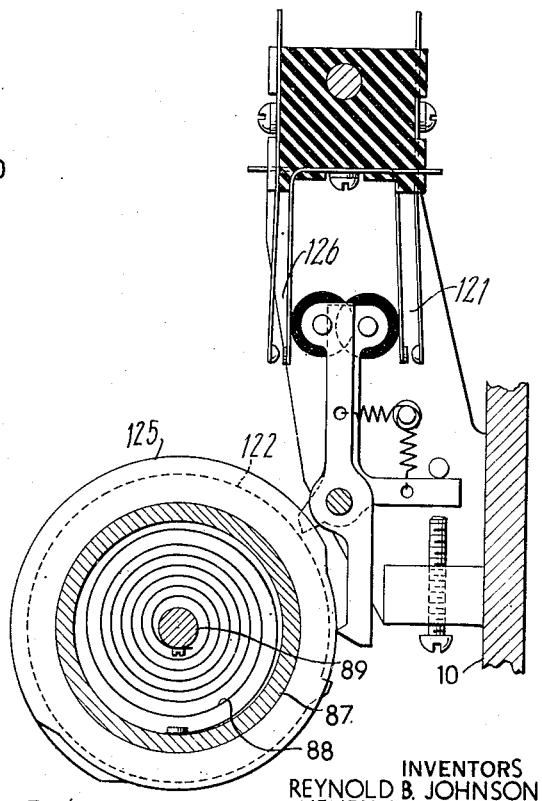
Fig. 16 is a section taken on lines 16—16 of Fig. 1 showing the arrangement of contacts controlled in accordance with the position of the readout mechanism.

The lever 107 has a finger 109 extending into a notch 110 in ring 80. Thus, as viewed in Fig. 4 energization of magnet 100 will urge extension 103 toward the left and with it the pins 104 which in turn will shift ring 105 and its pivot 106 toward the left to rock lever 107 about pivot 108 in a clockwise direction, whereby finger 109 will rock ring 80 clockwise about its pivot bolts 79 to withdraw pawl 83 from engagement with teeth 86. At the same time a stop 111 (Fig. 14) secured to ring 80 diametrically opposite pawl 83 will rock into engagement with a tooth 86 to hold the ring against rotation. With ring 80 rocked, the pawl 83 under the influence of its spring 85 (Fig. 13) will rock about pivot 84 into position to engage the next tooth 86, when the parts return to the position of Fig. 4. Thus, energization of magnet 100 will cause rocking of ring 80 to bring stop 111 into action to maintain the coupled relationship between gear 45 and ring 80. Upon deenergization of the magnet, ring 80 will step ahead one tooth space under the influence of the coil spring 88 (Fig. 5).

Referring to Fig. 21, the circuits for controlling the magnets 100 are shown in a very simplified manner as comprising a manually operated pair of key contacts 112 which through a pair of contacts 113 energize the magnet 100 whenever the key contacts are closed. The contacts 113 are controlled by a cam 114 secured to the drum 87 (Fig. 5) configured so that, when the readout structure is in its home position, contacts 113 are held open to prevent advance of the structure beyond such home position.

With the wipers in any advanced position, readout may be effected by manual closure of a pair of contacts 115 which through a switch 116 and contacts 117 controlled by a cam 118 will complete a circuit to the common conducting bar 97 and thence through any shifted wire 97 to corresponding magnet 119 and line 67. The magnets 119 may control punching devices or functional operations of the punching machine in the manner of corresponding magnets in patents referred to, for example, the magnets 154 of Patent 2,424,097. The cam 118 is secured to the drum 87 and configured to close the contacts 117 when the readout structure is in position one step in advance of the home position, so that after one readin entry has been made contacts 117 are closed, enabling a readout circuit to be completed. After this has been effected, the contacts 112 are closed to step the readout back to its home position.

In the diagrammatic showing of Fig. 21, readout of successive columns is made effective by manually closing contacts 115 and 112 in repeated succession, so that there is a readout circuit completed followed by a stepping operation.

Figure 15:
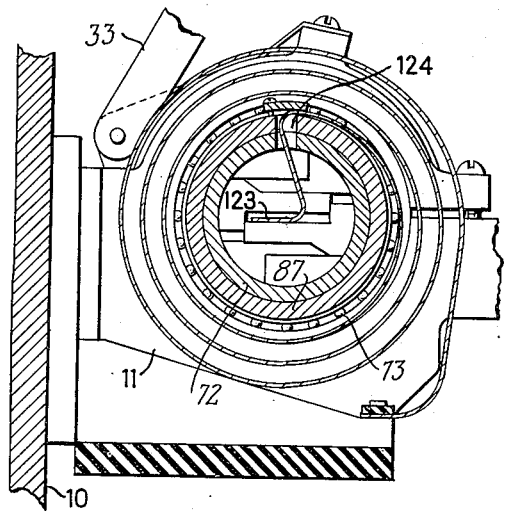
Fig. 15 is a section taken on lines 15—15 of Fig. 1 showing the arrangement of the readout circuit connecting cable.

In Fig. 5 each of the contactors 96 is connected to a wire in a flat cable 123, which extends axially to the left end of head 72 where it is bent as shown in Fig. 15 to pass through an opening 124 in cylinders 72 and 87 and then wound concentrically as shown, with the free end secured to the framework, and from here connections are made to the magnets 119. This arrangement permits free rotation of the readout structure without hindrance. As the wipers advance counterclockwise in Fig. 15, the cable winds in a tightened direction and as readout occurs it again unwinds. It will be noted, of course, that the wipers never make a complete revolution. After having advanced to a predetermined extent, another cam 125 (Fig. 21) will close a pair of contacts 126 to energize a lock magnet 127 which, as diagrammatically illustrated, will rock its armature 128 into locking engagement with bar 64 so that, when the readout structure has advanced to what is termed its full position, further entries are prevented until part of the data entered has been read out. In parallel with magnet 127 is a lamp 129 to visually indicate this full condition.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A data receiving and storing device comprising a cylinder having a ring of circumferentially spaced, closed pockets extending in a radial direction, a ball in each pocket normally seated in the outer extremity of the pocket, a data entering station adjacent to the cylinder, means for rotating the cylinder to bring the pockets in turn to said station, a readin device at said station effective to shift the ball in the pocket adjacent to the station to the inner extremity of said pocket, and control means for causing successive operation of said readin device and said rotating means to shift the ball and thereafter advance the cylinder to present the next pocket to the station.

2. A data receiving and storing device comprising a carrier having a series of spaced balls supported thereon, each of which has an active and an inactive position, a setting element for shifting the balls from inactive to active position, means for moving the carrier step by step to present the balls to the setting element one by one, means for causing the setting element to engage and move the adjacent ball to its active position, means for rendering the carrier moving means effective while the setting element is in engagement with the ball, said moving means causing the setting element to move with the carrier, and means for retracting the setting element after a predetermined extent of movement with the carrier.

3. The invention set forth in claim 2 in which means is provided to engage and retain the ball in its active position during the movement of the carrier and after the setting element has been retracted.

4. A data receiving and storing device comprising a rotatable carrier having a ring of circumferentially spaced closed pockets extending in a radial direction, a stationary dividing wall intersecting the ring of pockets so that one part of each pocket lies on one side of the wall and another part lies on the other side of the wall, said wall having an opening therein to afford communication between the two parts of the pockets, means for rotating the carrier to present each pocket in turn to said opening, a ball in each pocket normally located at one side of the wall, and means operated selectively as each pocket arrives at said opening for shifting the related ball through said opening to the other side of the pocket, so that such shifted ball will thereafter advance along the opposite side of the wall.

5. A data receiving and storing device comprising a carrier having a succession of spaced, closed pockets extending in a given direction, a stationary dividing wall intersecting the pockets along said given direction, so that one part of each pocket lies on one side of the wall and another part lies on the other side of the wall, said wall having an opening therein to afford communication between the two parts of the pockets, means for advancing the carrier in said given direction to present each pocket in turn to said opening, a ball in each pocket normally located at one side of the wall, and means operated selectively as each pocket arrives at said opening for shifting the related ball through said opening to the other side of the pocket, so that such shifted ball will thereafter advance along the opposite side of the wall.

6. The invention set forth in claim 5 in which the opening in said dividing wall is coextensive with a plurality of pockets, and means is provided and located to act on each pocket prior to operation of the shifting means for restoring any balls through the opening back to their normal location.

7. In a storage device of the class described, a cylinder having a ring of circumferentially spaced pockets opening into the outer circumference of the cylinder, a cylindrical casing fitted over said cylinder to close the open ends of the pockets, a ball in each pocket, means for oscillating the casing about its axis, a coupling device between the casing and cylinder arranged to turn the cylinder with the casing in only one direction and for a distance equal to the circumferential spacing of the pockets, a setting station to which the pockets are advanced, one for each oscillation of the casing, means at said station for selectively shifting the ball within the presented pocket to a different location therein, and means for holding the ball in a shifted position.

8. In a mechanism of the class described, a ring of circumferentially spaced balls, a setting station, means for moving the ring step by step to bring each ball in turn to said station, a lever at the station for engaging any ball, shifting it out of the ring, and holding it in shifted position, operating means for causing the moving means to move the ring and lever concurrently while the lever holds a ball in shifted position, holding means for engaging and holding the shifted ball upon its advance, and means for withdrawing said lever after said holding means has engaged the ball.

9. In a mechanism of the class described, a cylinder having rows of circumferentially spaced closed pockets in the wall therefor, and having a cylindrical groove extending through said wall to divide each pocket into two parts, a second cylinder extending into said groove to form a barrier between the two parts of the pockets, said second cylinder having an opening therein extending in the direction of its longitudinal axis, a ball in each pocket normally lying in the outer part of the pocket, means for rotating the first named cylinder to cause the rows of pockets to in turn pass said opening, and means effective as each row is in line with the opening for selectively shifting the balls through the opening to the inner part of the pocket and holding them until the row of pockets has passed the opening.

REYNOLD B. JOHNSON.
HENRY A. JURGENS.
OTTO F. MONEAGLE.

REFERENCES CITED

The following references are of record in the file of this patent:

UNITED STATES PATENTS

| Number | Name | Date |
|---|---|---|
| 1,576,167 | Wheeler | Mar. 9, 1926 |
| 1,771,905 | Uher, Jr. | July 29, 1930 |
| 2,119,064 | Watanabe | May 31, 1938 |
| 2,126,846 | Watanabe | Aug. 16, 1938 |
| 2,130,166 | Watanabe | Sept. 13, 1938 |
| 2,131,914 | Carrol | Oct. 4, 1938 |
| 2,163,302 | Zenner | June 20, 1939 |
| 2,298,939 | Griffiths | Oct. 13, 1942 |
| 2,327,465 | Shepherd | Aug. 24, 1943 |
| 2,336,543 | Hibbard | Dec. 14, 1943 |
| 2,371,491 | Wright | Mar. 13, 1945 |